United States Patent [19]
Hutar

[11] 3,720,008
[45] March 13, 1973

[54] COMPACT DEVICE FOR THE MULTIDIMENSIONAL PRESENTATION OF QUALITATIVE AND QUANTITATIVE DATA

[76] Inventor: Laddie F. Hutar, 3800 Lake Shore Drive, Chicago, Ill. 60613

[22] Filed: Nov. 22, 1971

[21] Appl. No.: 200,997

[52] U.S. Cl. .................................. 35/24 R, 35/73
[51] Int. Cl. ........................................ G09b 19/18
[58] Field of Search ...35/21, 24 R, 24 A, 24 B, 24 C, 35/27, 28.3, 73, 77; 46/31

[56] References Cited

UNITED STATES PATENTS

| | | | |
|---|---|---|---|
| 121,936 | 12/1871 | Fisher | 35/73 X |
| 1,700,318 | 1/1929 | Karsten | 35/24 R |
| 2,493,697 | 1/1950 | Raczkowski | 35/73 X |
| 3,460,271 | 8/1969 | Saxon | 35/21 |
| 3,553,854 | 1/1971 | Biltz | 35/24 R |

Primary Examiner—Harland S. Skogquist
Attorney—Albert H. Pendleton et al.

[57] ABSTRACT

To cope with the "explosion" of qualitative and quantitative information available today and to present it in a comprehensive and usable form for a plurality of time periods, a compact multidimensional device is provided comprising a plurality of multisegmentable discs and means for assembling said discs coaxially in juxtaposed parallel relationship. The segments of each disc are distinguishable appearance-wise from each other, such as by a color coding, so as to qualitatively distinguish data. The pattern of visually distinguishable appearance is common to all the discs with like segments of successive discs being in longitudinal axial alignment, whereby each disc may represent a finite time period. The radial size of each segment is adjustable so as to be quantitatively correlatable with the data. Particular embodiments have additional elements or features which increase the versatility and data handling capacity of the device.

10 Claims, 7 Drawing Figures

PATENTED MAR 13 1973 3,720,008
FIG. 1 FIG. 2 FIG. 3
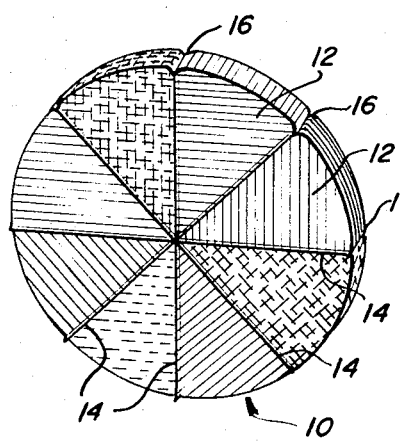
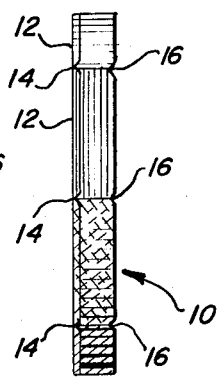
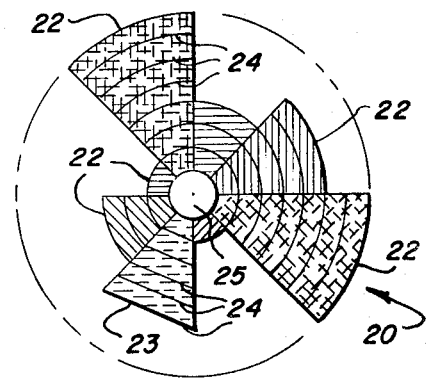
FIG. 4
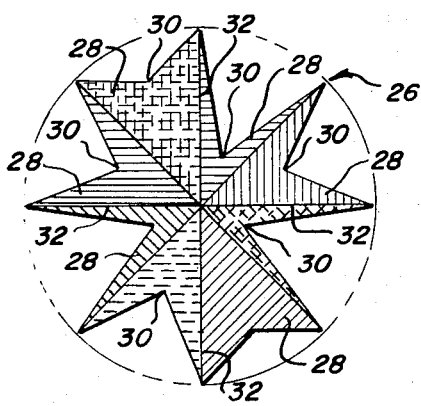
FIG. 6
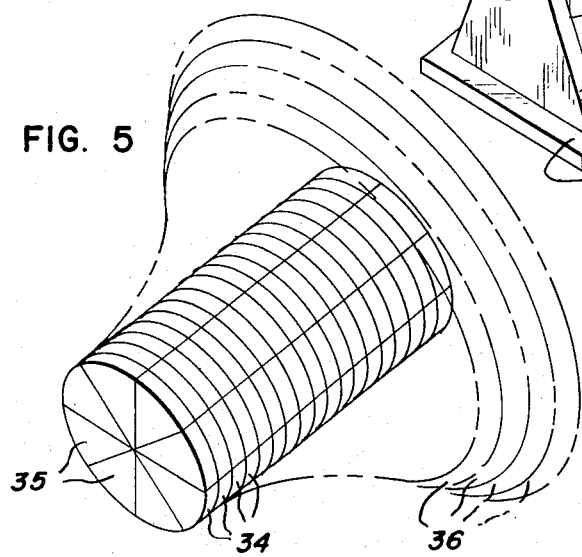
FIG. 5
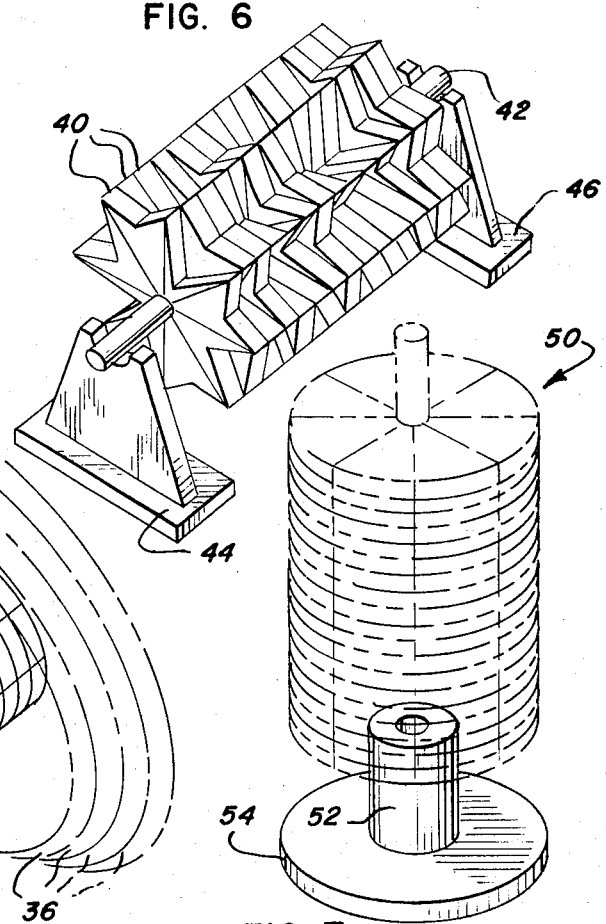
FIG. 7

COMPACT DEVICE FOR THE MULTIDIMENSIONAL PRESENTATION OF QUALITATIVE AND QUANTITATIVE DATA

BACKGROUND OF THE INVENTION

1. Field of the Invention

The present invention relates to a device for visually presenting qualitative and quantitative data and the changes therein extending over a finite time span. More specifically, it relates to a compact, multidimensional device which is capable of presenting a host of interrelated data covering successive time periods in a physical or tangible form which can be more-quickly and more-fully comprehended and understood.

While the present invention will be described with particular reference to certain advantageous embodiments employed in the presentation of business and financial data in visual and tangible form, it should be understood that the invention is not limited thereto. The device of the present invention can also be readily adapted to the effective visualization of a multiplicity of data in various fields, including, for example, government, military defense, education, the social sciences including psychology and sociology, medicine, science and engineering, as those skilled in the art will recognize in the light of the present disclosure.

2. Description of the Prior Art

In days gone by, managerial decisions were often made without sufficient factual foundations, sometimes with disastrous consequences. This sometimes resulted from a dearth of the right kind of data at the right time. In this day of systemized and sophisticated controls, often augmented by computer processing, however, the picture has drastically changed. While managerial decisions are still being made without a proper foundation, it is often not so much a lack of data but rather the inability to present and comprehend the plethora of data, both qualitative and quantitative, which is now being spewed forth day-in and day-out by modern hyperspeed computers. The gap between the availability of data and the comprehension and effective utilization of that data as a basis for managerial decisions promises to get worse before it becomes better.

Present-day techniques for coping with the information explosion leave much to be desired. The present-day manager is visual minded by conditioning and often resists the drudgery of attempting to comprehend and assimilate complex relationships when presented in the form of printed words such as in business reports and the like. To assist him, elaborate bar charts, line charts and other two-dimensional portrayers of information, whether in printed form, projected on screens, or presented in the form of easel-mounted charts, have commonly been resorted to. As those skilled in the arts of comprehension will testify, however, such visual aids are effectively limited to the presentation of only three to four items of information at one time. Thus, it is difficult to present an overall picture of complex data covering many facets of information, both qualitatively and quantitatively, particularly as they may change with the passage of time.

Even before the age of the computer, efforts were made to present data in physical form so as to render it more comprehensible and usable. Some of the prior art mechanical approaches took the form of two- and three- dimensional charts and various graphic and physical indicator systems. Illustrative of certain of these prior art efforts are the disclosures of U.S. Pat. Nos. 1,525,796, 1,700,318, 1,780,036, 2,316,147, 2,474,074, 2,925,669, 3,145,482 and 3,307,170.

Such prior art techniques, however, still left much to be desired. While helpful, the prior art effort suffered from one or more shortcomings such as, for example, restrictions on how many kinds of data could be effectively presented, limitations on the amounts of each type of data, the failure to effectively exhibit the data visually so that it can be quickly comprehended, the inability to portray complex interrelationships of different kinds of data, the undue complexity and high cost of certain devices and techniques, the lack of versatility of the data devices, and the like.

It is to the solution of this overall problem of data proliferation, data presentation, and data comprehension that the present invention is directed, as more fully reflected in the following objects. As used herein, the term "data" is to be construed broadly and is not necessarily limited to numerical information, unless so indicated. Thus, it can represent any type of information which is meaningful to the observer of the device herein described.

OBJECTS OF THE INVENTION

It is therefore a general object of the present invention to provide a device which effectively increases the control capability and span of control of man by presenting a multiplicity of data in a more-comprehensible form. It is another general object to provide a device which helps man cope with the "explosion" of qualitative and quantitative data which have become available for decision-making purposes. It is another general object to provide a communication device which helps to close the gap between availability of data and the comprehension and effective use of such data.

It is another general object to provide a device for the simplified and streamlined presentation of a multiplicity of interrelated qualitative and quantitative data. It is another general object to store data in a tangible "memory bank" which may be continuously and visually observed. It is another general object to provide a device for the storage of data which may be used in all facets of society, including, for example, government, military defense, education, the social sciences including psychology and sociology, medicine, science, engineering, business and finance.

It is a more specific object to provide a versatile, multidimensional device for the visual presentation of a multiplicity of data, which device may be physically compact and desk-size or even pocket-size. It is another specific object to provide a data exhibiter which provides one-glance comprehension of complex data and wherein particular types of data can be isolated for specific study.

It is another specific object to provide an accumulator for complex data which, in its simplest embodiments, is low in cost and capable of adjustment and comprehension by the non-technical observer. It is still another specific object to provide a device for presenting data in tangible physical form, which device may be readily converted to the solution of various data exhibition tasks.

These and other objects of the present invention will become apparent as the detailed description thereof proceeds.

SUMMARY OF THE INVENTION

These objects are achieved, in brief, by a three-dimensional device comprising in combination a plurality of multisegmentable discs and means such as a rod-like core for assembling the discs coaxially in juxtaposed parallel relationship. The discs, which may be circular, polygonal or otherwise suitably configured, usually have the same number of segments, each of which is distinguishable appearance-wise from the others making up that disc, such as, for example, by characteristic texture or by color coding, preferably the latter.

The pattern of distinguishable appearance is usually common to all the discs, and segments in successive discs having the same distinguishable appearance are preferably arranged in longitudinal axial alignment. It is this distinctive appearance within each disc which permits data to be qualitatively distinguished. It is the plurality of juxtaposed discs which permits time spans to be presented, each disc representing a given period, e.g., a month, quarter-year, half-year, year, or whatever finite time span is desired.

To quantify the data, the radial size or length of each of the segments making up each disc is adjustable whereby the size is correlatable with the data. In its simplest form, the segments are made adjustable by manufacturing them in substantially circular or cylindrical shape from a flangeable or otherwise severable material, e.g., soft metals, wood, plastic or the like. Thus, the size is simply tailored by cutting or otherwise severing each of the segments to correspond with the quantity being represented.

As aforementioned, the discs may be assembled in juxtaposed parallel relationship by mounting them on a rod-like core. For such purposes, the discs may be centrally apertured and, after assembling them on the core, secured thereto by tightening end fasteners. In such embodiments the rod-like core could be partially or completely threaded to receive complementary-threaded securing devices such as a wing nut. The rod-like core may also have a keyway or the like to receive a complementary projection on the discs whereby the segments of the successive discs are held in desired alignment for comparison.

The means for assembling the discs in juxtaposed parallel relationship may comprise magnetic means. In its simplest embodiment the magnetic means may consist of magnetized disc portions of appropriate polarity whereby the discs are magnetically attracted to form a unitary structure. In another embodiment a magnetic central core may be employed, e.g., Alnico, and each of the discs may have ferrite or other appropriate metallic portions which are attracted and secured thereby.

Each disc may be integral with individual segments being visually distinguishable by the coding, e.g., color, dividing lines with different letters or numbers for each segment, etc. Each disc may also be made up of individual wedges or pie-shaped segments which are assembled around the center. In a particular embodiment the individual segments may be held together magnetically to form the disc. The disc may also comprise a holder with radial walls into which each of the individual segments is assembled frictionally, magnetically, or the like.

In all embodiments, the individual segments may bear indicia thereon whereby the length may indicate directly, or be convertible to, quantifiable data. The indexing may be by a convenient means such as, for example, in the case of plastic discs and segments, index marking and/or numerical values molded directly on the projections at appropriate intervals.

In certain particular embodiments, still other "dimensions" of information may be incorporated into the device, in addition to qualitative and quantitative data and finite time periods. For example, the discs may be assembled whereby the axis of the device is deviated in a meaningful manner to indicate some particular information. Still another dimension of data may be incorporated by varying the thickness of the discs or the cross sections of the segments.

While successive time periods are distinguished in the embodiments described herein by successive discs, obvious equivalents will be apparent from the disclosure. Thus, for example, each disc could represent a different kind of qualitative information and the time dimension could be represented by successive segments of each disc.

BRIEF DESCRIPTION OF THE DRAWINGS

The present invention will be more clearly understood from the following detailed description of specific embodiments read in conjunction with accompanying drawings, wherein:

FIG. 1 is a perspective view of one embodiment of a multisegmented disc employed in the graphic device of the present invention;

FIG. 2 is an edge view of the disc shown in FIG. 1;

FIG. 3 is a front elevation view of a disc similar to that of FIG. 1 wherein the individual segments have been color coded and adjusted in length by severing annular segments therefrom to portray qualitative and quantitative information;

FIG. 4 is a front elevation view of another disc similar to that of FIG. 3 wherein the individual segments have been color coded and adjusted in length by removing pie-shaped portions therefrom to portray qualitative and quantitative information;

FIG. 5 is a perspective view showing how a plurality of the multisegmented discs of FIG. 1 are assembled to form the graphic device of the present invention, a variation being illustrated in dashed lines;

FIG. 6 is a perspective view of still another embodiment having an axial core and support means, the segments of the discs being color coded and dimensionally adjusted as in FIG. 4; and FIG. 7 is a perspective view of an alternative support structure for vertically disposing the graphic device of the present invention, as suggested in dashed lines.

It should be understood that the drawings are not necessarily to scale and that the embodiments are illustrated by graphic symbols and diagrammatic representations which may depart from actual appearances. In certain instances, details which are not necessary for an understanding of the present invention or which may render other details difficult to perceive have been omitted. For example, in FIGS. 5-7, the devices are assembled with fewer discs than may be desired in practice in the interest of drawing economy and the color coding symbols in FIG. 6 have been omitted so as not to obliterate other details. It should be understood, of course, that the invention is not necessarily limited to the particular embodiments illustrated herein.

DETAILED DESCRIPTION OF THE DRAWINGS, INCLUDING PREFERRED EMBODIMENT

Referring to FIGS. 1 and 2, the graphic device employs a plurality of multisegmented or segmentable discs such as indicated by disc 10 which is divided into eight segments 12 which are distinguishable appearancewise by, for example, an appropriate color coding. On the front face of disc 10 the segments are defined by upraised portions or protrusions 14, and on the rear face by complementary indentations 16. When a plurality of these discs are assembled, the front protrusions 14 interfit into the rear indentations 16 so as to inhibit relative movement and permit alignment of like coded segments.

A plurality of discs similar to disc 10 may be assembled and secured together by fabricating disc 10 from plastic or the like with an imbedded core of magnetic material adjacent the axis, the core having the appropriate magnetic polarities so that the front and rear faces of juxtaposed discs attract one another to form an integral unit. Alternatively, the disc may have a central aperture therein for a complementary elongated core member, which may be polygonal, cylindrical, or the like, as indicated in FIGS. 3, 6 and 7. A non-cylindrical core would provide additional means for preventing relative rotation of the discs and misalignment thereof. The discs may optionally be held in place frictionally, magnetically or by threaded fastening means on each end of the elongated rod, or the like.

In FIG. 3, disc 20 comprises individual pie-shaped segments 22 which are color coded to qualitatively distinguish information and adjusted in length to provide quantitative information. The segments may also be triangular as suggested by segment 23. The adjustment in length is made by severing each of the segments along the appropriate index marks 24 of the respective segments. Each index mark may represent quantitative values. As previously indicated, disc 20 may have a central aperture 25 for assembly on an elongated core.

To facilitate adjustment in length, the index marks may comprise deep indentations on the front and rear face of the disc so as to produce thinned areas which are readily severed. Alternatively, the areas may be severed with a sharp instrument, heated cutter or the like.

As an alternative to severing the segments, the segments may be made up of separate, individual pie-shaped, triangular-shaped or other appropriately shaped members. Segments of the desired color and size may then be selected from a supply of such segments having a variety of colors and a variety of sizes.

Instead of removing annular segments as in FIG. 3, V-shaped or pie-shaped portions may be removed from each segment as indicated on disc 26 of FIG. 4. The pie-shaped portions are removed from segments 28 by severing the segment toward the center thereof as indicated by center points 30. The depth of the center points 30 from the outer periphery is correlatable with the quantitative information to be displayed.

FIG. 4 illustrates another embodiment wherein disc 26 may comprise discrete segments 28, which are secured magnetically, frictionally, or otherwise, in a holder comprising radial walls 32. The radial walls 32 may extend the longitudinal length of the device to support the anticipated maximum number of discs. In this embodiment, aligned segments may be removed for more careful inspection or discussion, and a complementary V-shaped holder on a suitable support may be employed for such purposes.

FIG. 5 diagrammatically illustrates how individual discs 34 are assembled to form an integral graphic device, the embodiment of FIG. 5 being held together magnetically by internal magnetic means not visible in FIG. 5. The individual segments 35 of discs 34 in FIG. 5 have not as yet been adjusted radially to quantify the information being illustrated. This is done to suggest that the idealized configuration for the information being presented could be a cylinder. Alternatively, the idealized configuration could be frustoconical, or otherwise, as suggested by discs of progressively increasing diameter indicated by dashed portions 36. Thus, when the individual segments of the discs are adjusted dimensionally, the difference between the actual appearance and the idealized appearance becomes apparent.

In FIG. 6, a plurality of discs 40, which are similar to those of FIG. 4 but with an aperture for a center core, are assembled in juxtaposed parallel relationship on center core rod 42. The ends of rod 42 are supported on support means 44 and 46. It should be understood that the individual segments of discs 40 are color coded, and the color coding is identical for each disc. Thus, aligned segments of like color coding but different dimensional adjustment portray a given type of information over an extended time span. While the assembled device of FIG. 6 is relatively short, it should be understood that it may be extended as desired.

Referring to FIG. 7, the device illustrated by dashed structure 50 may be supported vertically in support structure 52 on stand 54. By such means, the device may be conveniently stored or displayed vertically, if desired.

From the above description it is apparent that many dimensions of information may be conveyed by the device of the present invention. Each disc provides qualitative information distinguished from one another by a color coding. The size of the segments in each disc provides quantitative information. A time factor is injected by using successive discs for successive time periods. Still another dimension of information results from the overall appearance of the device, particularly as compared to a model device having a desired or idealized overall configuration.

From the above description it is apparent that the objects of the present invention have been achieved. While only certain embodiments have been set forth, alternate embodiments and various modifications will be apparent from the above description to those skilled in the art. These and other alternatives and considered equivalents and within the spirit and scope of the present invention.

Having described the invention, what is claimed is:

1. A graphic device for the multidimensional presentation of qualitatively and quantitatively discrete data comprising in combination:

a. a plurality of multisegmentable discs;
   b. means for assembling said discs coaxially in juxtaposed parallel relationship;
   c. the segments of each disc being:
      1. visually distinguishable from one another to qualitatively distinguish the data, the pattern of distinguishable appearance being common to all discs, like segments of successive discs being in alignment,
      2. dimensionally adjustable radially whereby the size of each segment may be quantitatively correlatable with the data, 2. The device of claim 1 including support means for rotatably mounting the assembled discs.

3. The device of claim 1 wherein each of said multisegmentable discs comprises discrete segments assembled around a central axis.

4. The device of claim 3 wherein each of said discrete segments is removably secured in place magnetically.

5. The device of claim 1 wherein the segments comprise severable material whereby dimensional adjustments may be made by severing portions thereof.

6. The device of claim 1 wherein said means for assembling said discs coaxially comprises an elongated rodlike structure and said discs have a central aperture therein through which said rod-like structure passes.

7. The device of claim 1 wherein said means for assembling said discs coaxially comprises an elongated member which has peripheral troughs extending substantially the length thereof and said multisegmentable discs are supported in said troughs.

8. The device of claim 7 wherein said multisegmentable discs are supported magnetically in said peripheral troughs.

9. The device of claim 1 wherein said segments of each disc are visually distinguishable by a color coding common to all discs.

10. A graphic device for the multidimensional presentation of qualitatively and quantitatively discrete data comprising in combination:

a. a plurality of multisegmentable discs;
    b. means for assembling said discs coaxially in juxtaposed parallel relationship;
    c. support means for rotatably mounting the assembled discs;
    d. the segments of each disc being:
       1. color coded to qualitatively distinguish the data, the color coding being common to all discs, the segments of successive discs having the same color code being in alignment,
       2. severable in a radial direction whereby the size of each segment may be quantitatively correlatable with the data.

* * * * *